LINEAR FM SIGNAL GENERATOR

Filed Aug. 23, 1968 5 Sheets-Sheet 1

WITNESSES:
Bernard R. Giegucz
James F. Young

INVENTORS
Joseph Abruzzo and
William L. Price.
BY Dean Schron
ATTORNEY

LINEAR FM SIGNAL GENERATOR

LINEAR FM SIGNAL GENERATOR

Filed Aug. 23, 1968 5 Sheets-Sheet 4

LINEAR FM SIGNAL GENERATOR

Filed Aug. 23, 1968 5 Sheets-Sheet 5

United States Patent Office 3,530,404
Patented Sept. 22, 1970

3,530,404
LINEAR FM SIGNAL GENERATOR

Joseph Abruzzo and William L. Price, Severna Park, Md., assignors to Westinghouse Electric Corporation, Pittsburgh, Pa., a corporation of Pennsylvania Filed Aug. 23, 1968, Ser. No. 754,786
Int. Cl. H03b 23/00
U.S. Cl. 331—178 12 Claims

ABSTRACT OF THE DISCLOSURE

A linear FM digital signal generator employing the concept of a digital dynamic rate multiplier to provide a plurality of simultaneous frequency swept output voltages. The frequency from one output terminal differs from that from another ouptut terminal by a fixed selectable percentage at any instant during the sweep. Additionally, the signal generator is operable in several modes which allow the operator to select a digital output over a predetermined frequency band in stepped frequency increments or ramp function sweeps.

CROSS-REFERENCE TO RELATED APPLICATION

The present invention utilizes the concepts of an improved high frequency counter described in co-pending U.S. patent application by William L. Price, Ser. No. 748,261, filed July 29, 1968, entitled "Synchronous Digital Counter." This invention is also assigned to the assignee of the present invention.

BACKGROUND OF THE INVENTION

Signal generators providing an FM output are well known to those skilled in the electronics art. Such apparatus provides outputs which may additionally include a swept output over a predetermined frequency range according to a control function. Where a linear sweep is desired, the sweep linearity is determined by the inherent capability of the circuitry utilized.

A recent development in the art of electrical circuitry for generating digital functions is the rate multiplier which is described in an article entitled: "Many Digital Functions Can Be Generated With A Rate Multiplier" by Richard Phillips and appearing in Electronic Design of Feb. 1, 1968 at pages 82 through 85. The rate multiplier is a configuration comprising flip-flops and gates wherein two inputs are received. One input is called the rate input and is comprised of a pulse train $(f)$ while the other input, called the multiplier or control input, comprises a binary number (X) which is a number less than 1 (binary coded decimal). The output of the rate multiplier is a variable frequency pulse train, the output of which is the product of $(X)\times(f)$, that is, the rate multiplied by the control input. The rate multiplier is comprised of a binary scaler in addition to a selected number of gating networks and a control counter or register.

Additionally, the rate multiplier circuit has been utilized to synthesize frequency. Such a teaching appears in an article entitled "Digital Methods Synthesize Frequency" by Lewis Illingworth, appearing in Electronic Design of May 23, 1968 at pages 78 through 81.

SUMMARY

The present invention is directed to an improved FM signal generator the frequency of which can be varied in extremely linear increments at a selectable rate and provides square wave voltage outputs. It comprises a clock source for providing a clock signal of predetermined frequency; a variable frequency oscillator coupled to the clock source and which is comprised of a first or static rate multiplier circuit incorporating a scaler counter, a rate multiplier gating network, a control counter and a smoother counter for providing a selectable variable frequency with minimum jitter; a signal generator circuit coupled to the clock source and the first rate multiplier and which is comprised of a second or a dynamic rate multiplier circuit also including a scaler counter, a rate multiplier gating network, a control counter and a smoother counter for providing a swept frequency output; and selectable input data means including one or more input registers and an update circuit coupled to said first and second rate multiplier circuits for supplying digital input numbers to said first and second rate multiplier circuits and rendering the signal generator operable in one or more frequency bands and in a plurality of operating modes. The smoother counter means coupled to the rate multiplier gating network of the signal generator provides a cycle period output which is constant within predictable limits. Moreover, the smoother counter means may include a plurality of counters each having a selectable frequency percentage factor from one output frequency at any point in time.

DESCRIPTION OF THE PREFERRED EMBODIMENT

Figure 1:
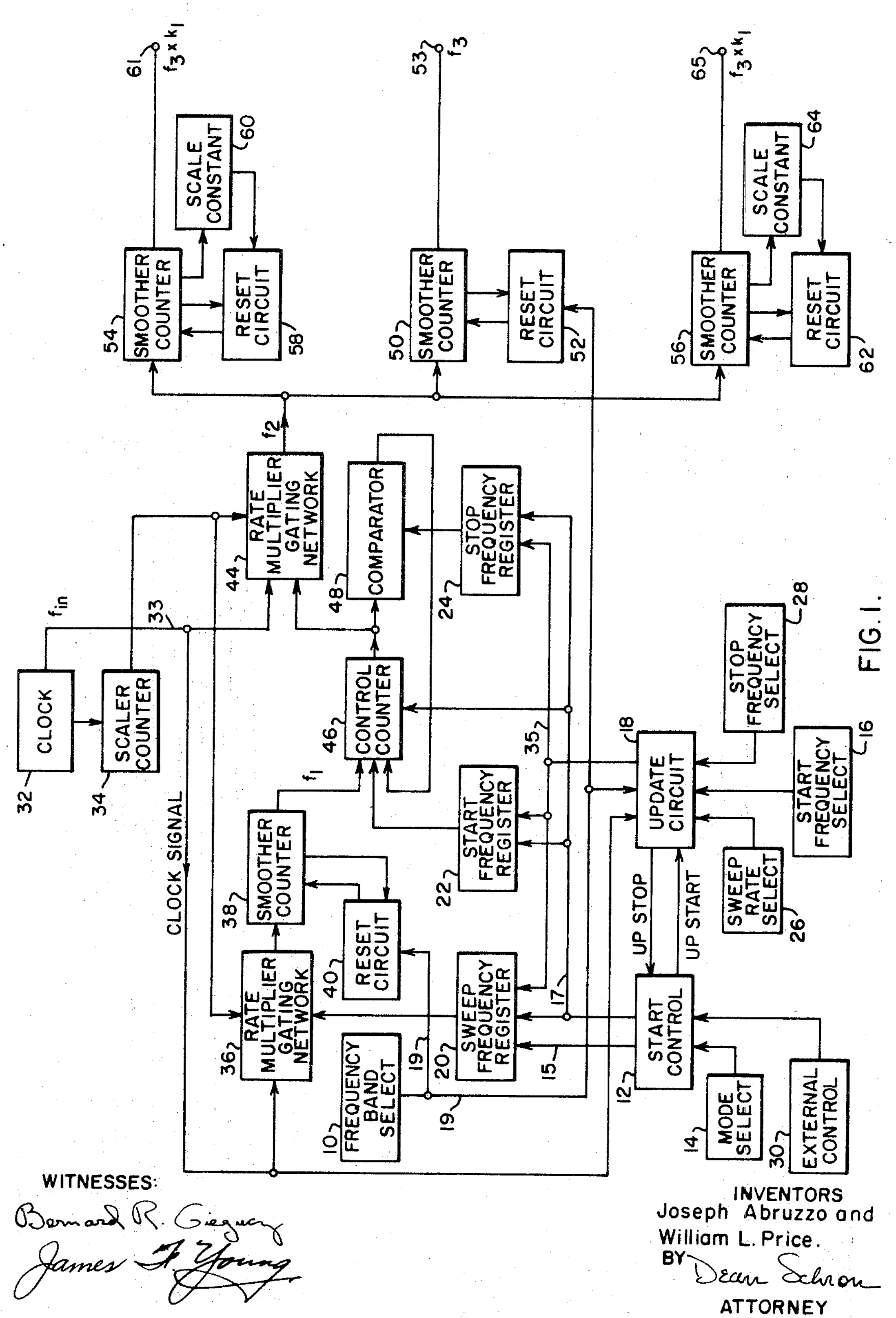
FIG. 1 is a block diagram illustrative of the preferred embodiment of the subject invention.

Referring to FIG. 1, the linear FM signal generator comprising the subject invention is comprised of a frequency band select circuit 10 for selection of output frequencies in the ranges of for example, 0 to 2.0 kHz., 0 to 3.0 kHz., 0 to 4.0 kHz. and 0 to 5.0 kHz. A selectable start and stop control circuit 12 is provided to enable the operator to initiate and terminate a restricted sweep within any of the four operating bands. A mode select circuit 14 is coupled to the start control circuit 12 and is adapted to provide a plurality of operating modes. A first or "stepped" mode produces a single continuous frequency corresponding to the start frequency setting provided by a start frequency selector means 16 coupled into the update circuitry 18 which has for its purpose, inter alia, supplying continuously varying input data to a sweep rate register 20, a start frequency register 22, and a stop frequency register 24. In the stepped mode, the frequency can be incremented by an amount not exceeding the linearity of the band. A second or "manual" mode is provided by the present invention which produces a repeatedly sweeping FM output signal covering the entire width of the band selected at a rate which is controlled by a sweep rate selector 26 which is coupled into the update circuit 18. Each time that the highest frequency of the band is reached, the apparatus resets to zero frequency and initiates a new FM sweep covering the entire selected frequency band. A third or "recycle" mode is also provided wherein the subject invention produces a continuously sweeping FM output signal between a selected start frequency as provided by the start frequency selector 16 and a stop frequency which is provided by a stop frequency selector 28. When the selected upper or stop frequency limit is reached, the apparatus resets to the start frequency and recycles; this continues until the mode is changed. A fourth or "single" mode is provided by the apparatus which produces a single FM digital sweep output between a selected start and stop frequency each time the start control 12 is enabled. When the upper frequency or stop frequency, is reached, the apparatus resets to zero frequency and stops sweeping. A fifth or "external" mode is provided whereupon the application of an external control signal from an external control means 30 coupled to the start control circuit 12 produces a single FM digital sweep between a selected start and stop frequency or at the end of the external control signal whichever occurs first at which time the apparatus resets to zero frequency.

The update circuit 18 additionally receives a clock signal input from a clock signal generator 32 on circuit buss 33 and in turn provides a scaled clock output signal on circuit buss 35 to the sweep rate register 20, the start frequency register 22 and the stop frequency register 24. The start control circuit 12 and the update circuit 18 are coupled together for receiving a "start update" signal upon initiation of an enabling signal and a "stop update" signal at the end of a predetermined interval according to the mode selected by means of the mode selector 14. When the start control circuit 12 is initiated, a "sweep enable" signal is coupled to the sweep rate generator 20 by means of circuit buss 15 and the scaled clock signal is applied to the registers 20, 22 and 24 from the update circuit 18. At the end of an update period, such as for example at the end of a selected mode or period within a mode, a "reset" signal is applied from the start control circuit 12 on circuit buss 17 to the registers 20, 22 and 24 in accordance with the "stop update" control signal. Additionally, the scaled clock output from the update circuit 18 is determined by the frequency band select circuit 10 which feeds a control signal to the update circuit 18 by means of circuit buss 19.

Figure 2:
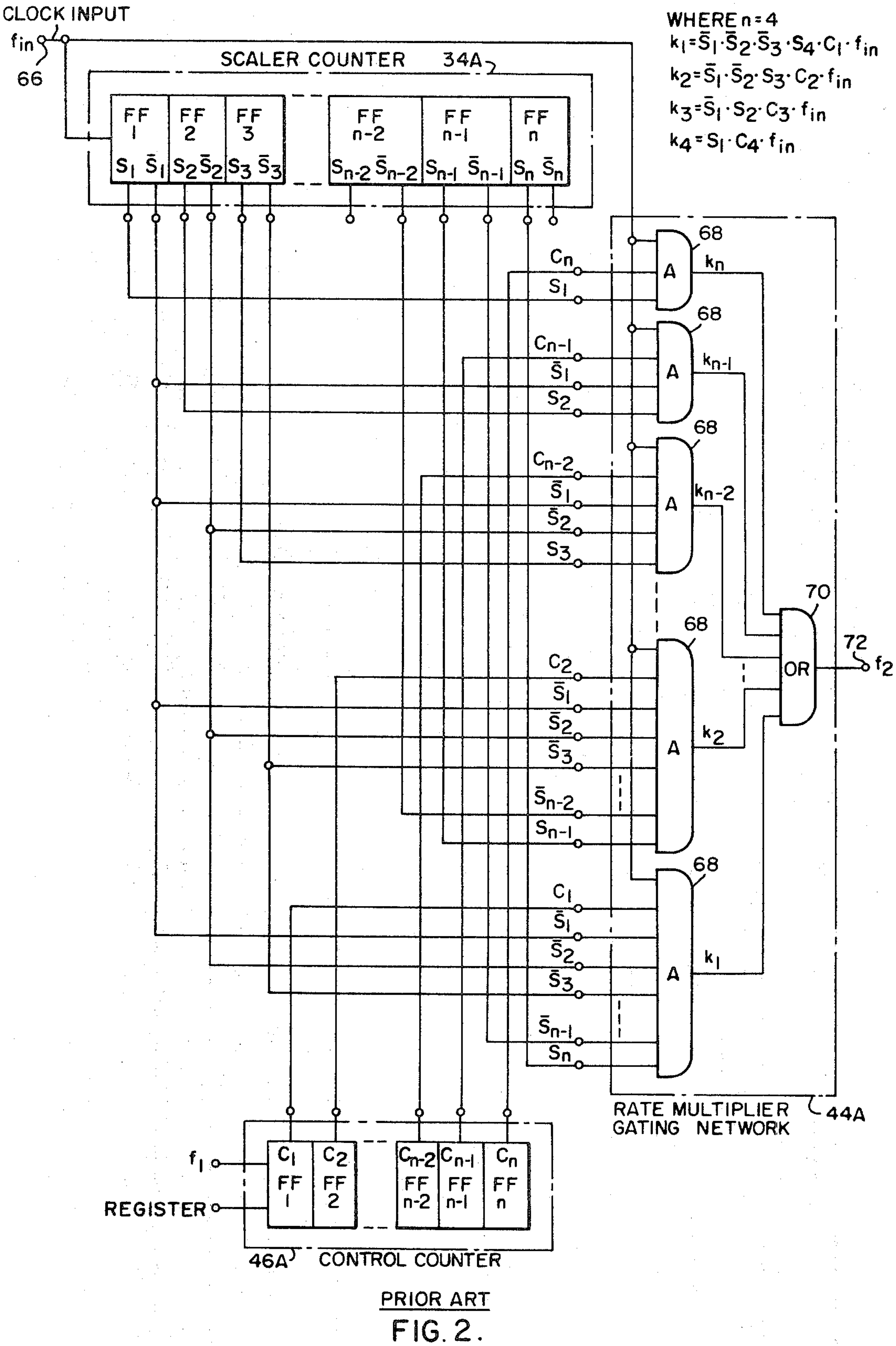
PRIOR ART FIG. 2.
FIG. 2 is a block diagram illustrative of a rate multiplier configuration of the known prior art and helpful in understanding the operation of the subject invention.
Figure 3:
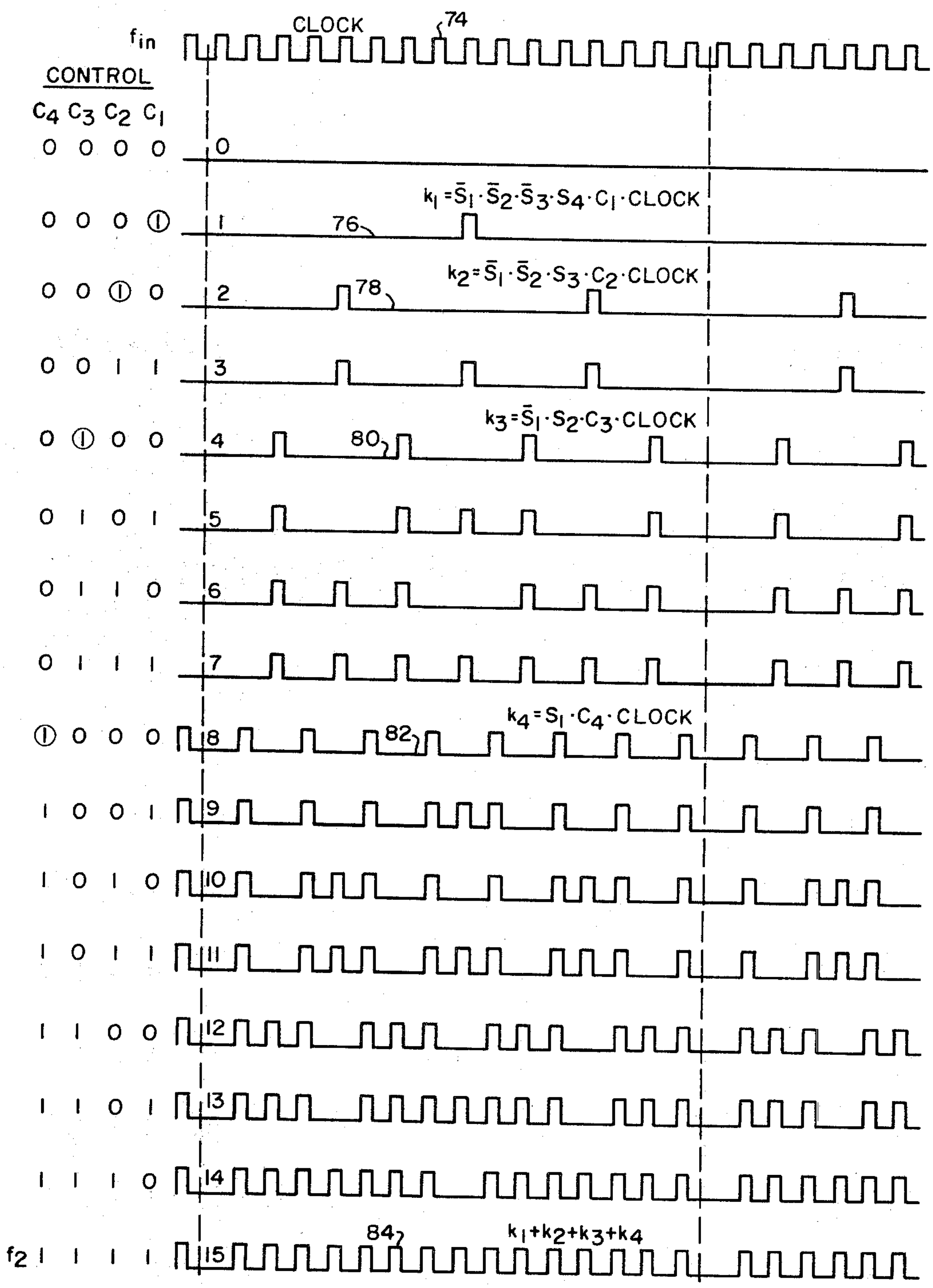
FIG. 3 is an illustrative diagram of typical waveforms produced by the rate multiplier configuration shown in FIG. 2.

Thus far the embodiment shown in FIG. 1 has considered only the control circuitry utilized. Continuing further, a variable frequency pulse generator providing a digital output is coupled to the clock source 32 and is comprised of a first or static rate multiplier circuit which incorporates a scaler counter 34, a first rate multiplier gating network 36 and the sweep rate register 20. The operation of a rate multiplier circuit will be described more fully subsequently when FIGS. 2 through 4 are considered. The rate multiplier however produces a unique average output frequency for each control code input. If the output is fed into a smoothing counter that passes one pulse for every $(2^n-1)$ pulse inputs, the resulting device is a variable oscillator possessing the following characteristics:

$$\text{Frequency increment}=\Delta f=\frac{1}{2^n}\cdot\frac{1}{2^n-1}\cdot f_{in}$$

$$\text{Upper frequency}=f_u=\frac{2^n-1}{2^n}\cdot\frac{1}{2^n-1}\cdot f_{in}=\frac{1}{2^n}\cdot f_{in}$$

$$\text{Output period accuracy}=A_p=\pm\frac{1}{f_{in}}$$

where, $n$ is equal to the number of counter bits, and $f_{in}$ is the clock frequency. Because the pulse to pulse spacing of the output of a rate multiplier is not uniform, a smoother counter 38 is coupled to the first gating network 36 to provide a uniform frequency output. A reset circuit 40 is coupled to the smoother counter 38 and is fed a digital input from the band select circuit 10 over circuit buss 19 for providing the selected frequency division of the clock signal according to the rate multiplier function. The first rate multiplier circuit provides a selectable frequency output in accordance with the digital input applied to the sweep rate register 20 and the reset circuit 40. The output from the smoother counter 38 provides a pulse train $f_1$ comprising the input to a second or dynamic rate multiplier circuit including the aforementioned scaler counter 34, a second rate multiplier gating network 44 and a control counter 46. The output of the control counter 46 is fed into the gating network 44 which also receives the scaler counter output from the scaler counter 34. Additionally, a comparator circuit 48 is coupled to the control counter 46 and receives an input from the stop frequency register 24 for the purpose of stopping the operation of the apparatus at a predetermined upper fiequency limit.

The control counter 46 receives digital inputs from the first rate multiplier smoother counter 38 circuit, the start frequency register 22 and the comparator 48 for providing a constantly changing digital number into the control counter 46 where it is gated with the scaler counter output 34 to selectively gate portions of the clock pulse train in the multiplier gating network 44. Thus, a digital output is provided which has a swept frequency $f_2$ which is variable in accordance with the digital information fed into the registers 20, 22 and 24, the update circuit 18, and the band select circuit 10. As noted with respect to the first rate multiplier circuit, the output $f_2$ comprises a waveform which has a pulse to pulse spacing which is generally not uniform. Accordingly, at least one smoother counter 50 and its associted reset circuit 52 under the control of the band frequency select circuit 10 is coupled to the second rate multiplier gating network 44 to provide a uniform frequency output of $f_3$ at terminal 53. In the present invention, however, two additional smoother counters 54 and 56 are coupled to the output of the second multiplier gating network 44. The second smoother counter 54 additionally includes a reset circuit 58 and a scale constant select circuit 60 for providing an offset count of the smoother counter 54 so that its output is $f_3\times k_1$ at terminal 61 where $k_1$ is a selectable percentage factor. The third smoother counter 56 includes its associated reset circuit 62 and additionally includes a respective scale constant select circuit 64 for providing an offset count which provides an output from the smoother counter of $f_3\times k_2$ at terminal 65 where $k_2$ is a selectable percentage factor.

An expression for the sweep rate value of the output $f_2$ of the second rate multiplier circuit comprising the sweep generator can be derived as follows:

$$\text{Sweep Rate:}=\frac{\text{steps}}{\text{sec.}}\times\frac{\text{c./s.}}{\text{step}}=\text{c./s.}^2$$

$$\text{c./s.}^2=\frac{N_a}{2^Y}\cdot\frac{f_a}{X_a}X\frac{1}{2^n}\cdot\frac{f_b}{X_b}=\frac{N_a f_a f_b}{2^Y 2^n X_a X_b}$$

where:

$N_a$=number of counts in the sweep rate register 20
$f_a$=sweep rate register 20 input frequency
$f_b$=control counter 46 input frequency
$x_a$=first smoother counter 8 value
$x_b$=second smoother counter 50 value
$n$=number of output bits in rate multiplying gating network 44
Y=number of sweep rate bits in rate multiplying network 36.

In order to provide a better understanding of the subject invention and the rate multiplier circuits comprised thereof, attention is now directed to FIG. 2 which discloses in block diagrammatic form a typical rate multiplier circuit presently known to those skilled in the art. The configuration shown illustrates an $n$ bit rate multiplier circuit comprised of a scaler counter 34A having $n$ stages of flip-flops $FF_1 \ldots FF_n$ providing outputs of $S_1$ and $\overline{S}_1 \ldots$, $S_n$ and $\overline{S}_n$ respectively. The scaler counter 34A is adapted to receive a clock input signal from a clock source not shown coupled to the terminal 66. The scaler counter 34A may either be a ripple or synchronous binary counter; however, a synchronous binary counter is preferred. A rate multiplier gating network 44A includes a plurality of AND gates 68 providing outputs of $K_1$, $K_2$ . . ., $K_{n-1}$ and $K_n$. A common OR gate 70 is coupled to all of the AND gates 68 and provides the rate multiplier output $f_2$. A control counter 46A comprised of $n$ flip-flop stages $FF_1$ . . . $FF_n$ receives digital data input from the start frequency register 22 and the frequency $f_1$ from the first rate multiplier circuit shown in FIG. 1. The frequency $f_1$ can selectively be a constant frequency or a linearly varying frequency at a predetermined sweep rate. The control counter 46A provides outputs of $C_1$, $C_2$ . . . , $C_{n-1}$, and $C_n$. The scaler counter 34A and the control counter 46A have their outputs selectively coupled to the AND gates 68 of the gating network 44A.

The output $f_2$ of the OR gate 70 is a frequency equal to the clock frequency $f_{in}$ applied to the scaler counter 34A times the ratio of the existing content in the control counter 46A to the maximum count when it contains all "1's." Where the quantity in the control counter 46A is increased in a linear fashion by varying the input $f_1$ the output frequency at terminal 72 increases linearly. It should be noted that the output of the OR circuit 70 is comprised of the algebraic sum of the pulse trains $K_1$ through $K_n$ from the AND gates 68.

Each gating function contributes a scaled portion of the input clock $f_{in}$ to the final rate multiplier output according to the following expressions:

$$K_X=\bar{S}_1\cdot\bar{S}_2\cdot\bar{S}_3 \ . \ . \ . \ \bar{S}_{x-1}\cdot S_x\cdot C_{n+1-x}\cdot f_{in}$$

and $$0\leq X\leq n$$

where $n$=number of scaler or rate multiplier bits $K_X$=X'th gate function or output contribution corresponding to the X'th scaler bit. $K_X$ is referred to as the X'th scaler output.

$\bar{S}$=the reset output of the scaler bit indicated by the subscript.

S=the set output of the scaler bit indicated by the subscript.

C=designated control counter output.

The scaling factor of the $K_X$ contribution is equal to $\frac{1}{2}_X$ and corresponds to the binary weight of the X'th scaler bit. The state of the control counter determines the output pulse train by presenting a particular combination of gate functions to the output ORing device. The output ORing device produces a signal equal to the sum of the scaler outputs. That is, the number of output pulses that occur during a cycle of the scaler counter is equal to the sum of the contributing scaler output pulses. The number of output pulses is also equivalent to the value of the control counter content.

If the output of the rate multiplier is averaged over the period of the scaler counter, the average frequency of the pulse train would equal to the input frequency $f_{in}$ times the ratio of the control counter contents to the number of possible control counter states. This input/output relationship is given by the expressions $$(f_{out})_{AVE}=\frac{X}{2^n}\cdot f_{in}$$

and, $$0\leq X\leq 2^n-1$$

where:

$(f_{out})_{AVE}$=output frequency averaged over the time required for the scaler to recycle $f_{in}$=rate multiplier input clock X=contents of the control counter $2^n$=number of possible control counter states $n$=number of rate multiplier bits.

The frequency resolution of $(f_{out})_{AVE}$ is equal to the reciprocal of the maximum number of scaler states times the input frequency. To obtain this resolution on a per cycle basis requires that a smoothing counter (equal to the maximum scaler count) be added in series to the rate multiplier output. The smoothing counter generates one output pulse for a fixed number of input pulses. A smoothing counter with a maximum count double that of the scaler would permit this accuracy on a half-cycle basis.

$$R=\frac{1}{2^n}\cdot f_{in}$$

where:

R=frequency resolution $2^n$=number of scaler states $n$=number of scaler bits $f_{in}$=rate multiplier input frequency.

Accordingly, where the configuration shown in FIG. 2 comprises a four bit rate multiplier, $n$=4 and, $$K_1=\bar{S}_1\cdot\bar{S}_2\cdot\bar{S}_3\cdot S_4\cdot C_1\cdot f_{in}$$

$$K_2=\bar{S}_1\cdot\bar{S}_2\cdot S_3\cdot C_2\cdot f_{in}$$

$$K_3=\bar{S}_1\cdot S_2\cdot C_3\cdot f_{in}$$

$$K_4=S_1\cdot C_4\cdot f_{in}$$

and $$f_2=K_1+K_2+K_3+K_4$$

This can be further illustrated by reference to FIG. 3 which comprises typical waveforms present at the gates 68 in a four bit rate multiplier at the times the control counter 46A content changes. The content of the control counter 46A, i.e. the state of the outputs $C_1$, $C_2$, $C_3$ and $C_4$ are shown with respect to each waveform. Waveform 74 is illustrative of the clock signal $f_{in}$. The waveform 76 occurs when the control output $C_2$ is in its respective "1" state while all other outputs are "0" giving rise to the AND gate output $K_2$. Likewise waveforms 80 and 82 provide outputs $K_3$ and $K_4$, respectively, when the control outputs $C_3$ and $C_4$ are in their respective "1" states. Since it has been noted that the output $f_2$ of the rate multiplier which is the output of the OR gate 70 appearing at terminal 72 is the input frequency $f_{in}$ times the ratio of the existing content X of the control counter to the maximum count when it contains all ones, it can be seen that waveform 84 satisfies the conditions because control outputs $C_1$, $C_2$, $C_3$ and $C_4$ are all in their "1" states. Therefore, waveform 84 represents $f_2$ the algebraic sum of the outputs $K_1+K_2+K_3+K_4$. Stated another way the waveform 84 is a composite waveform of waveforms 76, 78, 80 and 82. It can further be seen by reference to FIG. 3 depending upon the state of the control counter 46A, the output from the OR gate 70 can be a series of irregularly spaced pulses. For this reason a smoothing counter is required. As noted above the smoothing action provides a cycle period which is constant within predictable limits. If the smoothing counter count is made equal to the maximum scaler count, the frequency resolution on a per cycle basis is equal to the reciprocal of the maximum scaler count.

Figure 4A:
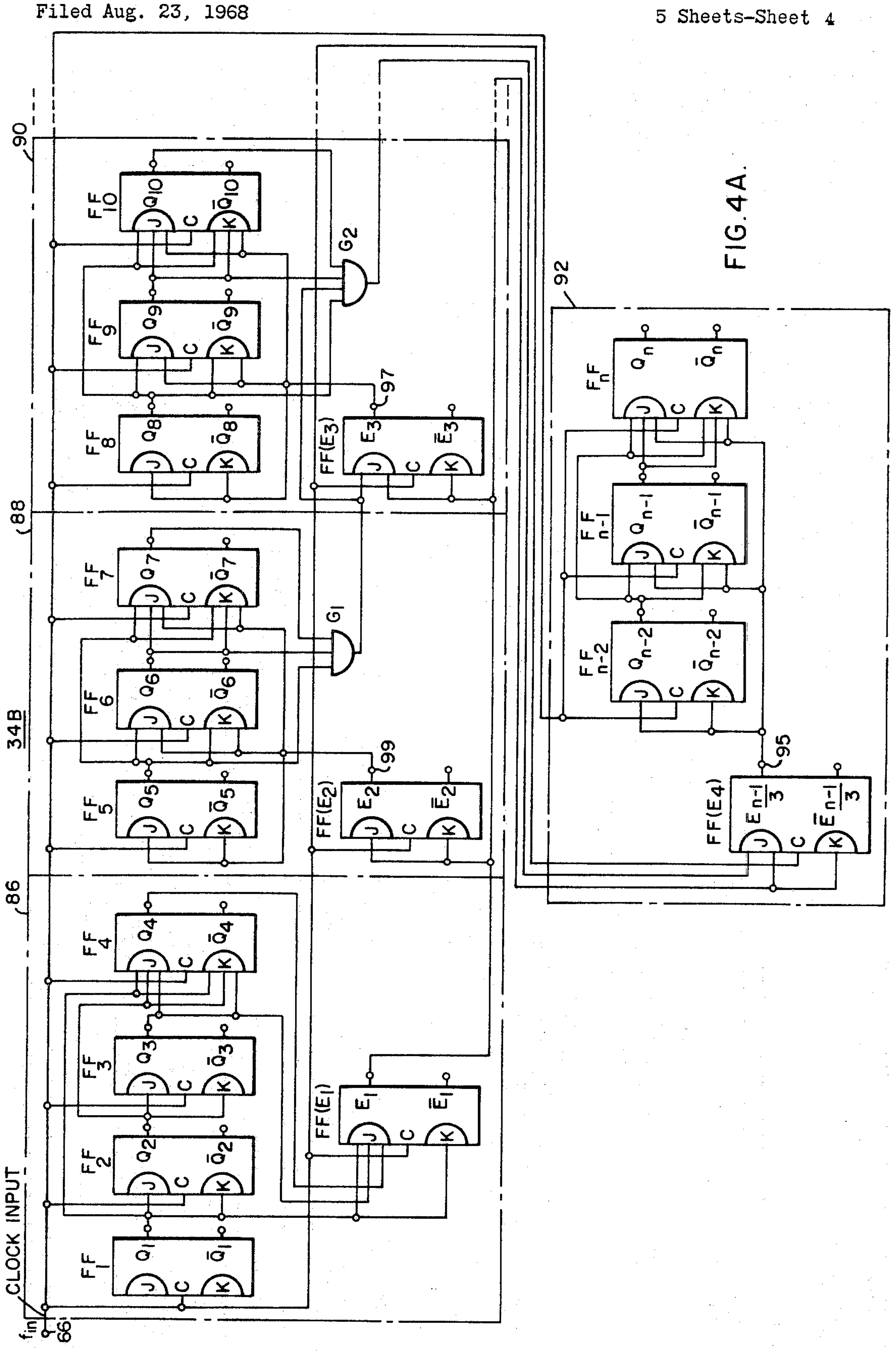
FIGS. 4A and 4B illustrate in block diagrammatic form an improved rate multiplier circuit having simplified gating and preferably utilized in combination with the subject invention.
Figure 4B:
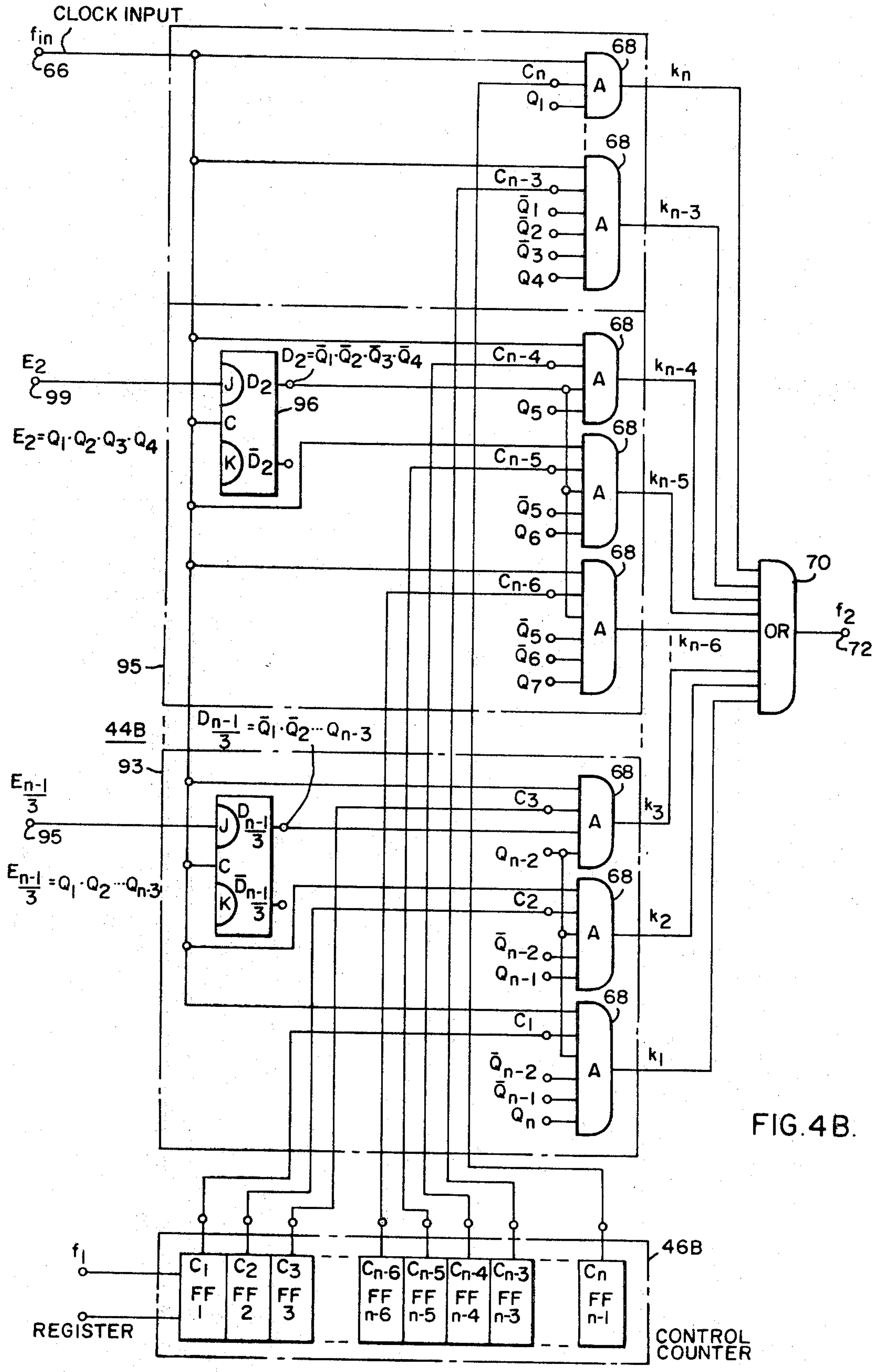

Considering now FIGS. 4A and 4B in combination, there is disclosed an improved rate multiplier circuit having simplified gating whereby the inventive concept as disclosed in the aforementioned related application entitled "Synchronous Digital Counter" Ser. No. 748,261 is incorporated. A scaler counter of the type described in said aforementioned related application comprises a plurality of binary counting groups or sets of computing elements, for example, J-K flip flops wherein each set contains a like number of computing elements or bits with the exception of the first set which has one additional computing element. A synchronizing control or enabling circuit is associated with each group of computing elements and, with the exception of the first enabling circuit, controls the operation thereof. The first enabling circuit provides a synchronous control or enabling input to all succeeding enabling circuits. The first control or enabling circuit moreover is controlled by the first set of computing elements to provide a signal that synchronizes the subsequent control or enabling circuits with the first group of counting elements. Thus the counting sequences through each set of counting elements in succession as the respective enabling circuit is successively operated at the end of the counting sequence of the preceding group in synchronism with and under the control of the first enabling circuit which is referred to as the "master" enabling circuit.

The scaler counter 34B as is shown in FIG. 4A, is coupled to a rate multiplier gating network 44B and a control counter 46B as shown in FIG. 4B. The simplified gating is achieved by means of the enabling circuits associated with the scaler counter 34B shown in FIG. 4A.

More particularly, the scaler counter 34B is comprised of a plurality of binary counting groups or sets 86, 88, 90 and 92 wherein the first set is identified by reference numeral 86 and the last or *n*th group is identified by reference numeral 92. The first set of computing elements 86 includes four J–K flip-flop circuits $FF_1 \ldots FF_4$ coupled together as a four bit synchronous binary counter of the conventional type wherein the AND function is provided internally at both the J and K inputs. The clock signal $f_{in}$ is applied simultaneously to all of the C inputs by means of a clock signal applied to terminal 66. A master enable circuit comprising flip-flop circuit $FF(E_1)$ is coupled to the clock signal by its C input and receives three inputs of $Q_1$, $Q_3$ and $Q_4$ at its J input. The K input receives a signal $Q_1$ from the first flip-flop FF1. The master enable circuit $FF(E_1)$ couples its $E_1$ output simultaneously to all succeeding enable circuits $FF(E_2)$, $FF(E_3) \ldots$, and $FF(E_4)$ at their respective J and K inputs. All succeeding sets of computing elements 88 through 92 include an identical number (3) of computing elements, for example, J–K flip-flop circuits FF5, FF6 and FF7 in group 88. The clock signal applied "toggles" successive groups of computing elements while the groups themselves are operated "synchronously." This feature is provided by the operation of the enabling circuits comprising flip-flops $FF(E_1)$ through $FF(E_4)$. The AND gates $G_1$, $G_2$, etc. associated with the intermediate groups of computing elements effect successive enabling of the following enabling circuit in combination with the $E_1$ output signal from the master enable flip-flop $FF(E_1)$.

The enabling devices producing signals $E_2$, $E_3$ and $$E_{\frac{n-1}{3}}$$

are operated in synchronism with the preceding groups of counting elements. This gives rise to an improved gating network for the rate multiplier gating network 44B shown in FIG. 4B. It should be observed that $$E_{\frac{n-1}{3}} = Q_1 \cdot Q_2 \ldots Q_{n-3}$$

As noted earlier with respect to the rate multiplier circuit shown in FIG. 2, the rate multiplier gating network is comprised of a plurality of AND gates feeding a common OR gate. In the present embodiment the gating network 44B also includes a plurality of AND gates 68 and a common OR gate 70; however, the AND gates 68 are selectively coupled to the enabling flip-flops $FF(E_2)$, $FF(E_3) \ldots$, and $FF(E_4)$ in groups of three so that each AND gate never has more than six (6) inputs coupled thereto from the scaler counter outputs $Q_1$ through $Q_n$ and the control center outputs $C_1$ through $C_n$. This is accomplished by coupling the last enable signal $$E_{\frac{n-1}{3}}$$

to a first group 93 of three AND gates 68 to provide the outputs of $K_1$, $K_2$ and $K_3$, respectively, through a one clock time delay J–K flip-flop 94 which provides an output signal $$D_{\frac{n-1}{3}}$$

which is equal to $\overline{Q}_1 \cdot \overline{Q}_2 \ldots \overline{Q}_{n-3}$. In a like manner the remaining groups of AND gates for example group 95 have a respective delay flip-flop 96 which provides the outputs $K_{n-6}$, $K_{n-5}$ and $K_{n-4}$. The delay J–K flip-flop 96 receives the enabling input signal $E_2$ at terminal 99 and provides an output $D_2$ wherein $D_2 = \overline{Q}_1 \cdot \overline{Q}_2 \cdot \overline{Q}_3 \cdot \overline{Q}_4$. The last group 100 of three AND gates which outputs of $K_{n-3}$, $K_{n-2}$, $K_{n-1}$, and $K_n$ receive selective Q and C signals directly from the respective counter stages. The output OR gate 70 receives the inputs $K_1$ through $K_n$ in the same maner as described with respect to the configuration shown in FIG. 2 to provide an algebraic sum of the multiple signals $K_1 + K_2 + \ldots + K_n$.

It can be seen by comparing the configurations shown in FIGS. 2 and 4B that the required gate size for an *n* bit rate multiplier is reduced from $n+2$ inputs to 6.

This configuration overcomes the limitation of impractical gate sizes and loading on the scaler bits (reset outputs) that increases with the length of the rate multiplier. The rate multiplier circuit shown in FIGS. 4A and 4B is composed of modular groupings which are isolated from each other so that the loading on each of the counting elements and gates does not increase as the length of the rate multiplier is increased. Also a large number of gate inputs are not required. Additionally, the number and length of interconnections between the counting elements and gates are reduced thereby reducing the propagation delay due to stray reactance.

What has been shown, therefore, is a linear FM signal generator incorporating an improved rate multiplier circuit which overcomes three basic problems inherent in such apparatus, that being flip-flop loading, gate size and enable propagation delay.

While there has been shown and described what is at present considered to be the preferred embodiment of the invention, modifications thereto will readily occur to those skilled in the art. It is not desired therefore that the invention be limited to the specific arrangements shown and described but it is to be understood that all equivalents, alternations and modifications within the spirit and scope of the present invention are meant to be included.

We claim as our invention:

1. An FM signal generator providing an output of variable frequency comprising in combination;

- a clock signal source providing a clock input signal;
- selectable input data means for selectively generating reference input digital numbers according to the predetermined control function or mode;
- a source of variable frequency digital signals derived from said clock input signal and selected digital input data comprising a first rate multiplier circuit coupled to said clock signal source and selectable input data means for providing a fixed or a variable frequency output therefrom in accordance with said predetermined control function; and
- a signal generator circuit comprising a second rate multiplier circuit coupled to said clock signal source, said first rate multiplier circuit and said selectable input data means for multiplying said clock input signal by a digital number corresponding to a combined value of the fixed or variable frequency output of said first rate multiplier circuit and selected digital input data from said selectable input data means for providing a digital output sweep which is variable between selected frequency limits according to said predetermined control function.

2. The invention as defined by claim 1 wherein said selectable input data means additionally includes an update circuit for providing a continuous input of reference input digital numbers to said first and second rate multiplier circuits at predetermined time intervals.

3. The invention as defined by claim 2 wherein said first and said second rate multiplier circuits additionally include smoother circuit means coupled thereto for providing a uniform digital output frequency.

4. The invention as defined by claim 2 wherein said selectable input data means additionally comprises:

start frequency selector means coupled to said update circuit for determining a lower limit frequency output;

stop frequency selector means coupled to said update circuit for determining an upper limit frequency output; and a sweep rate selector means coupled to said update circuit for determining the rate of change of frequency sweep from a lower limit frequency to the upper limit frequency during a predetermined period.

5. The invention as defined by claim 4 and additionally including a start control circuit and a mode select circuit coupled to said first and second rate multiplier circuits for initiating and terminating a frequency sweep as well as providing a control signal thereto for operating said signal generator in a plurality of operating modes.

6. The invention as defined by claim 3 wherein said smoother circuit means coupled to said second rate multiplier comprises a first smoother counter for providing a first output frequency, a second smoother counter having a counting constant applied thereto for providing an output frequency which is a selectable first percentage of said first output frequency, and a third smoother counter having a counting constant applied thereto for providing a third output frequency which is a second selectable percentage of said first output frequency.

7. The invention as defined by claim 1 wherein said first and second rate multiplier circuit each comprises:

a scaler counter circuit coupled to said clock signal source;

a control counter or register coupled to said selectable input data means and having a digital content comprising selected reference input digital numbers;

and a rate multiplier gating network coupled to said scaler counter and said control counter as well as said clock signal source for multiplying the clock input signal by said reference input digital numbers in combination with the content of the scaler counter.

8. The invention as defined by claim 7 wherein said rate multiplier gating network comprises:

a plurality of AND gates selectively coupled to said clock signal source, said scaler counter and said control counter;

and an OR gate network coupled to said plurality of AND gates for providing a pulse train output which is comprised of the algebraic sum of the outputs from said plurality of AND gates.

9. The invention as defined by claim 7 wherein said scaler counter comprises:

a plurality of counting elements coupled together in a plurality of variable length sequential groups or sets operating in a straight binary counting code including means for having said clock signal simultaneously applied to said groups;

an enabling circuit respectively coupled to each group of counting elements of said plurality of groups including means for having said clock input signal simultaneously applied thereto;

first circuit means coupling selected outputs of the first group of said plurality of counting elements to the input of the first enabling circuit for controlling the operation thereof;

second circuit means coupling the output of said first enabling circuit simultaneously to the input of all succeeding enabling circuits, said first enabling circuit being operable to control the operation of all succeeding enabling circuits thereby;

third circuit means coupling the output of each said succeeding enabling circuit simultaneously to the input of at least the first counting element in the respective group of counting elements to which it is coupled; and fourth circuit means selectively gating the gating of all of the counting elements of selected groups to the respective succeeding control circuit.

10. The invention as claimed in claim 9 and wherein said rate multiplier gating network recited in claim 4 comprises: a plurality of AND gate circuits and a common OR gate coupled to each AND gate circuit and additionally including fifth circuit means for selectively coupling selected groups of said plurality of AND gates to said third circuit means.

11. The invention as defined by claim 10 wherein said fifth circuit means comprises at least one delay circuit having a one clock time delay selectively coupled to one group of AND gates.

12. The invention as defined by claim 8 wherein said at least one delay circuit is comprised of a bistable device.

No references cited.

JOHN KOMINSKI, Primary Examiner